United States Patent [19]

Sorenson

[11] 4,246,168

[45] Jan. 20, 1981

[54] ANTI-STATIC VINYL CHLORIDE POLYMERS

[75] Inventor: Wayne R. Sorenson, Ponca City, Okla.

[73] Assignee: Conoco, Inc., Ponca City, Okla.

[21] Appl. No.: 11,260

[22] Filed: Feb. 12, 1979

Related U.S. Application Data

[63] Continuation of Ser. No. 891,861, Mar. 30, 1978, abandoned.

[51] Int. Cl.³ ............................................... C08K 5/58
[52] U.S. Cl. ............................ 260/45.75 J; 428/407

[58] Field of Search ............... 428/407; 260/DIG. 15, 260/33.4 R, 45.75 J, 45.75 S; 526/1

[56] References Cited

U.S. PATENT DOCUMENTS

| 3,627,718 | 12/1971 | Seifert | 526/4 |
| 3,745,116 | 7/1973 | Brindell | 260/DIG. 15 |

*Primary Examiner*—Paul R. Michl
*Attorney, Agent, or Firm*—R. J. Carlson

[57] ABSTRACT

This invention relates to anti-static vinyl chloride polymer compositions and a method of preparing such compositions.

6 Claims, No Drawings

ANTI-STATIC VINYL CHLORIDE POLYMERS

This is a continuation of application Ser. No. 891,861, filed Mar. 30, 1978, now abandoned.

Vinyl chloride polymers, like most plastics, tend to accumulate static electrical charges, particularly under atmospheric conditions of low relative humidity. Since these polymers are normally commercially produced in a particulate form, such accumulation of static electrical charges is troublesome causing many problems from a materials handling standpoint in that the polymer particles tend to agglomerate or adhere to each other and to other materials such as containers and processing equipment.

It is generally known that the above mentioned problems may be countered with the use of anti-static agents incorporated with the polymer either internally or externally. Commonly used anti-static agents include amides and amines, polyalkylene glycol and derivatives thereof, glycerol, sulfides and sulfonates, ethers, esters and quaternary ammonium compounds. For example, see U.S. Pat. No. 3,627,718; British Pat. No. 1,318,132; Japanese Pat. No. 47-18220; Japanese Pat. No. 47-18221; Japanese Pat. No. 47-18222; Japanese Pat. No. 47-21821; Japanese Pat. No. 45-24022; Japanese Pat. No. 48-28333; Japanese Pat. No. 45-23434; and British Pat. No. 1,319,198. Further discussion of anti-static agents may be found in the *Encyclopedia of Polymer Science and Technology* published by Interscience in 1967. With certain of the aforementioned anti-static agents (i.e., glycerol), there is oftentimes experienced a detrimental effect on organotin stabilizers which are conventionally employed with vinyl chloride polymers to inhibit degradation.

In accordance with this invention, it has been found that 1,4-butanediol, 2,2-dimethyl propanediol-1,3, and 1,1,1-tri(hydroxymethyl) propane are effective anti-static agents for vinyl chloride polymers. In addition, it has been found that 1,4-butanediol and 2,2-dimethyl propanediol-1,3, when used in anti-static amounts, do not have a detrimental effect on the stability of vinyl chloride polymers which have been stabilized with organotin stabilizers.

The invention is applicable to a wide variety of vinyl chloride polymers including homopolymers, copolymers, terpolymers, graft polymers and physical blends of such polymers with other polymers. Copolymers of vinyl chloride with various olefin comonomers, such as ethylene, propylene, butene-1 and hexane-1, are suitable, as are other comonomers such as styrene, vinyl acetate, vinylidene chloride, acrylic and methacrylic acid esters, acrylonitrile and alkyl vinyl ethers. Terpolymers include combinations of these comonomers. Graft polymers may include grafting of these comonomers onto a polyvinyl chloride backbone or grafting of vinyl chloride onto an ethylene-vinyl acetate copolymer backbone as well as others known in the art. Blends may include the above polymers with such polymers as SBR or ABS.

The anti-static agents of the invention are employed by applying them to the surfaces of the particulate polymer in any manner known in the art. For example, such application may conveniently be accomplished by dissolution of the agent in an inert liquid carrier and sprayed or otherwise introduced to the mass of polymer particles. Agitation of the polymer particles is desirable to thoroughly distribute the agent throughout the particles. A highly satisfactory technique for applying the agents is to spray a solution of the agent into a fluidized mass of the polymer particles with subsequent volatilization of the carrier.

The inert liquid carrier should be capable of dissolving the agent while at the same time having sufficient volatility under conditions of application that it becomes essentially volatilized and escapes to the surrounding atmosphere. Water is a preferred carrier.

In general, any concentration of the agent in the liquid carrier may be used as desired. Such concentrations may range as low as 0.1 percent by weight agent to as high as the maximum solubility of the agent in the carrier. For low concentrations, consideration should be given to the amount of carrier that may be required to provide the necessary quantity of anti-static agent and the ultimate effects of using the required amount of carrier. For high concentrations, consideration should be given to the ability to apply such concentrations uniformly to the polymer particles. When using water as the inert carrier, satisfactory concentrations may range from about 5% by weight agent to about 60% by weight agent.

The amount of anti-static agent to be used to impart anti-static characteristics to the vinyl chloride polymer particles should generally be in the range of about 0.01 phr (part per hundred parts resin by weight) to about 0.10 phr. Amounts less than 0.01 phr achieve little noticeable effect. Amounts above about 0.10 phr achieve little additional effect.

The anti-static agent of the invention may be used with vinyl chloride polymers which contain the usual types of other additives such as stabilizers, fillers, processing aids, pigments, plasticizers, etc.

Use of certain of the anti-static agents of the invention are particularly advantageous when used in vinyl chloride polymers which contain organotin stabilizers. Unlike glycerol, a common anti-static agent, the 1,4-butanediol and 2,2-dimethylpropanediol-1,3 anti-static agents of the invention do not detrimentally affect the stabilizing function of organotin stabilizers. These organotin stabilizers are well known and commercially available. Generally, they can be defined as mono- or dialkyl tin moieties attached to sulfur containing groups or carboxylate bearing groups. The alkyl groups normally attached to the tin include methyl, butyl, and octyl groups. Some typical examples are dibutyltin dilaurate, dibutyltin maleate, dibutyltin laurate-maleate, dibutyltin bis (monoalkyl maleate), dibutyltin bis (lauryl mercaptide), dibutyltin S,S-bis (isooctyl thioglycolate), dibutyltin-$\beta$-mercaptopropionate, di-n-octyltinmaleate, dimethyltin maleate, dibutyltin di-2-ethylhexoate, di-n-octyltin-$\beta$-mercaptopropionate and dimethyltin bis (lauryl mercaptide).

The invention is further illustrated by the following examples, it being understood that these examples are not intended to limit the invention.

EXAMPLE 1

The anti-static agents of the invention were applied to polyvinyl chloride polymer particles and tested in the laboratory for anti-static characteristics. Each agent was tested by placing 100 g of particulate polyvinyl chloride polymer in a Waring blender operating at low speed sufficient to turn the polymer over. The anti-static agent was added as a fifty percent aqueous solution and the blender speed was increased and maintained at maximum speed for one minute to thoroughly mix the agent with the polymer particles and also to generate the static electrical charges. The water carrier apparently became substantially evaporated as the polymer particles had a dry appearance.

The resulting polymer particles were then used to fill an upright stainless steel cylinder (3.81 centimeters high-2.54 centimeters diameter). The cylinder was then raised upward and the polymer particles allowed to freely flow outward into a pile. The pile was then observed as to texture and diameter, the coarser the texture and smaller the diameter the poorer the anti-static characteristics. The results were as follows:

TABLE I

| Anti-static Agent | Amount (phr) | Pile Characteristics | |
|---|---|---|---|
| | | Texture | Diameter |
| None (Control) | | Coarse | Small |
| 1,4-Butanediol | 0.02 | Smooth | Large |
| 1,4-Butanediol | 0.05 | Smooth | Large |
| 2,2-Dimethylpropanediol-1,3 | 0.02 | Smooth | Large |
| 2,2-Dimethylpropanediol-1,3 | 0.05 | Smooth | Large |
| 1,1,1-tri(hydroxymethyl) propane | 0.05 | Smooth | Large |

The results demonstrate that the anti-static agents of the invention are effective in imparting anti-static characteristics to the polymer particles.

EXAMPLE 2

In a different test, the effectiveness of 2,2-dimethylpropanediol-1,3 as an anti-static agent was demonstrated by applying 0.02 phr of the agent to particulate polyvinyl chloride. Equal samples, by weight, of each of the thus treated polyvinyl chloride particles and untreated polyvinyl chloride particles were assembled. Each sample was placed in a funnel with the lower spout closed. The spout was opened and the time for the particles to completely discharge from the funnel was noted.

The polyvinyl chloride particles treated with 2,2-dimethylpropanediol-1,3 required 8-9 seconds to flow from the funnel whereas the untreated polyvinyl chloride particles would not flow from the funnel under the same condition.

EXAMPLE 3

The effect of the 1,4-butanediol and 2,2-dimethylpropanediol-1,3 anti-static agents of the invention on the stabilizing effect of organtin stabilizers compared to the corresponding effect of glycerol, a common anti-static agent, was evaluated by initially preparing a control dry blend sample of 100 parts by weight polyvinyl chloride particles, 0.3 phr (part per hundred resin) of a methyltin mercaptide stabilizer (TM 181, Cinncinnati Milicron), 3.0 phr of an acryloid processing aid, 0.5 phr of a paraffin wax lubricant (Advawax 165) and 0.8 phr calcium stearate. Additional dry blend samples of this same formulation were prepared, each of which also included 0.1 phr of an anti-static agent. Each sample was then subjected to working on an mill operating at about 195° C. After an elapsed time of 1 minute, a chip was quickly cut from the sheet and milling is resumed. This procedure was continued with chips being cut after intervals of 2, 3, 4 and 5 minutes. The color of each chip was observed and a comparison was made of the discoloration of the chips formed from formulations containing the anti-static agents against the discoloration of the control chips.

TABLE 2

| Anti-Static Agent | Observation |
|---|---|
| 1,4-butanediol | Color of chip after 5 minutes was same as color of control chip after 5 minutes. |
| 2,2-dimethylpropanediol-1,3 | Color of chip after 5 minutes was same as color of control chip after 5 minutes. |
| Glycerol | Color of chip after 2 and 3 minutes bracketed (2 minute chip is lighter in color and 3 minute chip is darker in color) color of control chip after 5 minutes. |

The above tests demonstrate that the 1,4-butanediol and 2,2-dimethylpropanediol-1,3 anti-static agents of the invention have essentially no adverse effect on the stabilizing effect of the organotin stabilizers whereas glycerol apparently degraded the stabilizing effect of the organotin stabilizer. It is also pointed out that 1,1,1-tri-(hydroxymethyl) propane had a similar effect as glycerol on the stabilizing effect of organotin stabilizers.

Thus, having described the invention in detail, it will be understood by those skilled in the art that certain variations and modifications may be made without departing from the spirit and scope of the invention as described herein and defined in the appended claims.

I claim:

1. A vinyl chloride polymer in particulate form containing an organotin stabilizer and having an external application of an anti-static amount of an anti-static agent consisting of 1,4-butanediol; 2,2-diemthyl propanediol-1,3; or mixtures thereof.

2. The invention of claim 1 wherein the anti-static agent is present in an amount in the range of 0.01 to 0.10 phr.

3. The invention of claim 2 wherein the anti-static agent is present in an amount in the range of 0.01 to 0.05 phr.

4. The invention of claim 1 wherein the vinyl chloride polymer is polyvinyl chloride; a copolymer of vinyl chloride and vinyl acetate, or a copolymer of vinyl chloride and vinylidene chloride.

5. The invention of claim 4 wherein the anti-static agent is 1,4-butanediol.

6. The invention of claim 4 wherein the anti-static agent is 2,2-dimethylpropanediol-1,3.

* * * * *